Patented Feb. 27, 1945

2,370,569

UNITED STATES PATENT OFFICE 2,370,569

PREPARATION OF CARBONIC ACID ESTERS

Irving E. Muskat and Franklin Strain, Akron, Ohio, assignors to Pittsburgh Plate Glass Company, Allegheny County, Pa., a corporation of Pennsylvania No Drawing. Application March 28, 1941, Serial No. 385,775

7 Claims. (Cl. 260—463)

This invention relates to a novel method of preparing unsaturated carbonate esters of dihydroxy ethers and particularly to the esters of polyglycols.

In accordance with this invention it has been found that such esters may be produced by reaction of dichloroformates of the polyglycols and unsaturated alcohols. The invention is particularly applicable to the production of esters from dichloroformates of alkylene polyglycols such as di-, tri-, and tetraethylene glycol, di-, tri-, and tetrapropylene glycol, ditrimethylene glycol and the dibutylene glycols, or the corresponding polyglycols of trimethylene glycol, pentamethylene glycol, etc. Dichloroformates of other dihydroxy ethers such as mono methyl or mono ethyl or mono oleyl ether of glycerol, thio diglycol, etc., or other dihaloformates such as described in our copending application Serial No. 385,774 filed March 28, 1941, (Case A-170). These dihaloformates are reacted with one or a mixture of unsaturated alcohol, particularly alcohols containing from 3 to 10 carbon atoms such as allyl, methallyl, crotyl, isocrotyl, propargyl, tiglyl or cinnamyl alcohols, citronellol, geraniol, methyl vinyl carbinyl, or the higher molecular alcohols including oleyl and linoleyl alcohols or the unsaturated alcohols derived from China-wood oil or other drying oil acids or the substituted alcohols such as 2-chloroallyl, 2-bromoallyl, chlorocrotyl, 3-chlorobutene-2-ol-1, or other halogen substituted alcohols.

The reaction may be promoted by the presence of an alkaline reagent including, organic bases such as pyridine, dimethyl aniline and quatenary ammonium bases such as trimethylphenyl ammonium hydroxide, the oxides, carbonates, and hydroxides of sodium, potassium, calcium, barium, strontium, magnesium, and other alkali or earth alkali metals. The alkaline agent may be in solution or it may be dispersed in the reaction liquid as a finely pulverized solid material. Water may be present or the reaction may be conducted under substantially anhydrous conditions. It may, under some circumstances, be desirable to add diluents, such as water, benzene, acetone, carbon tetrachloride or dioxane.

The reaction temperature may be maintained at normal room temperature (15-25° C.). Frequently lower temperatures are desirable because of the increased yields obtained under such circumstances. When calcium carbonate is used as an alkaline agent higher temperatures may be used to increase the rate of reaction frequently yields may then be increased by other means, for example, by use of excesses of alkaline reagent and unsaturated alcohol. Almost quantitative yields may frequently be obtained at temperatures above 50° C. by use of excesses of reactants. These excesses may be recovered and used in subsequent preparations.

The esters prepared in accordance with this invention are generally liquids, but may in some cases, be solids at normal temperatures. They are usually miscible in acetone, benzene, ethyl alcohol and dioxane and have utility as solvents for many organic compounds. These esters are useful as plasticizers for organic plastics such as vinyl acetate, urea, styrene, cellulose, phenol, and acrylic resins. The materials themselves are polymerizable to hard resins, having many useful properties.

The following examples are illustrative:

Example I

Five moles of diethylene glycol bis chloroformate was added gradually to a mixture of 11 moles of methallyl alcohol and 11.2 moles of pyridine and 850 cc. of benzene. The mixture was maintained at about 10° C. through the reaction and uniform conditions were maintained in the reaction vessel by vigorous stirring. The benzene solution was washed twice with 6N HCl until mixture was acid to xylene cyanole and then washed with sodium chloride solution until neutral to litmus. After decolorizing, with charcoal, the solvent was evaporated on a steam bath and the diethylene glycol bis (methallyl carbonate) was purified by distillation at a pressure of 2-3 mm. A yield of 84% was produced.

Example II

A mixture of 2.2 moles of methallyl alcohol and 3 moles of sodium hydroxide was prepared. To this 1 mole of diethylene glycol bis chloroformate was gradually added. The mixture was not cooled and the heat of reaction increased the temperature to a maximum of 40° C. The diethylene bis (methallyl carbonate) was purified as in Example I. A yield of 4.9% was produced.

Example III

A mixture of 5 moles of diethylene bis (chloroformate) and 15 moles of finely divided calcium carbonate was prepared in a three-necked flask equipped with a reflux condenser and a stirring mechanism. Fifteen moles of allyl alcohol were added gradually over a period of 1 and ½ hours. The reaction mass was heated to 50-70° C. during the first hour and 70-90° C. during the last thirty minutes. The diethylene bis (allyl carbonate) was washed with dilute hydrochloric acid and purified by distillation.

*Example IV*

1.2 moles of methallyl alcohol were gradually added to .5 mole of dipropylene glycol bis (chloroformate), 1000 cc. of benzene, and .6 mole of finely divided calcium carbonate. The temperature was maintained between 100° C. and 125° C. during the addition which required 35 minutes. The mixture was permitted to remain at temperature for 15 minutes after the addition was completed. The product was washed with hydrochloric acid and water. The excess alcohol and the benzene were distilled off at atmospheric pressure and the propylene glycol bis (methallyl carbonate) purified by vacuum distillation.

Although the invention has been described with reference to specific details of certain modifications thereof, it is not intended that such details shall be regarded as limitations upon the scope of the invention except insofar as included in the accompanying claims.

This case is a continuation-in-part of Serial No. 361,280, filed October 15, 1940.

We claim:

1. A method of preparing a polyglycol bis (unsaturated alcohol carbonate) which comprises reacting a polyglycol dichloroformate with an unsaturated monohydric alcohol in the presence of an alkaline agent.

2. A method of preparing diethylene glycol bis (unsaturated alcohol carbonate) which comprises reacting diethylene gyycol dichloroformate with an unsaturated monohydric alcohol in the presence of an alkaline agent.

3. A method of preparing a polyethylene glycol bis (unsaturated alcohol carbonate) which comprises reacting a polyethylene glycol dichloroformate with an unsaturated monohydric alcohol in the presence of an alkaline agent.

4. A method of preparing diethylene glycol bis (allyl carbonate) which comprises reacting diethylene glycol dichloroformate with allyl alcohol in the presence of an alkaline agent.

5. A method of preparing diethylene glycol bis (methallyl carbonate) which comprises reacting diethylene glycol dichloroformate with methallyl alcohol in the presence of an alkaline agent.

6. A method of preparing diethylene glycol bis (chloroallyl carbonate) which comprises reacting diethylene glycol dichloroformate with chloroallyl alcohol in the presence of an alkaline agent.

7. A method of preparing a polyglycol bis (unsaturated alcohol carbonate) which comprises reacting a polyglycol dichloroformate with an alcohol from the group consisting of pentenols, butenols, and propenols, in the presence of an alkaline agent.

IRVING E. MUSKAT.
FRANKLIN STRAIN.